United States Patent
O'Dell, III et al.

(10) Patent No.: US 9,471,203 B1
(45) Date of Patent: Oct. 18, 2016

(54) PRESENTING ANIMATED VISUAL SUPPLEMENTAL CONTENT

(71) Applicant: Audible, Inc., Newark, NJ (US)

(72) Inventors: Douglas Vincent O'Dell, III, Montclair, NJ (US); Colin Anton Ochel, Wall, NJ (US)

(73) Assignee: AUDIBLE, INC., Newark, NJ (US)

( * ) Notice: Subject to any disclaimer, the term of this patent is extended or adjusted under 35 U.S.C. 154(b) by 241 days.

(21) Appl. No.: 14/475,282

(22) Filed: Sep. 2, 2014

(51) Int. Cl.
| | |
|---|---|
| G06F 3/00 | (2006.01) |
| G06F 3/0483 | (2013.01) |
| G06F 3/16 | (2006.01) |
| G06F 3/0482 | (2013.01) |
| G06F 17/30 | (2006.01) |

(52) U.S. Cl.
CPC ........... *G06F 3/0483* (2013.01); *G06F 3/0482* (2013.01); *G06F 3/162* (2013.01); *G06F 17/30056* (2013.01)

(58) Field of Classification Search
CPC ................................................. G06F 17/30056
USPC .......................................................... 715/716
See application file for complete search history.

(56) References Cited

U.S. PATENT DOCUMENTS

| | | | | |
|---|---|---|---|---|
| 7,788,582 | B2 * | 8/2010 | Robbin ............. | G06F 17/30749 715/716 |
| 8,046,689 | B2 * | 10/2011 | Naik ................. | H04L 29/06027 715/716 |
| 2008/0119953 | A1 * | 5/2008 | Reed ................. | G06F 17/30017 700/94 |
| 2008/0120196 | A1 * | 5/2008 | Reed ................. | G06F 17/30017 705/17 |
| 2008/0120311 | A1 * | 5/2008 | Reed ................. | G06F 17/30017 |
| 2008/0120312 | A1 * | 5/2008 | Reed ................. | G06F 17/30017 |
| 2008/0120330 | A1 * | 5/2008 | Reed ................. | G06F 17/30017 |
| 2008/0120342 | A1 * | 5/2008 | Reed ................. | G06F 17/30017 |
| 2011/0145068 | A1 * | 6/2011 | King ..................... | G06F 17/211 705/14.55 |
| 2011/0177481 | A1 * | 7/2011 | Haff .................. | G06F 17/30032 434/317 |
| 2013/0055141 | A1 * | 2/2013 | Arriola ............. | G06F 17/30056 715/776 |

* cited by examiner

*Primary Examiner* — William Titcomb
(74) *Attorney, Agent, or Firm* — Knobbe, Martens, Olson & Bear, LLP

(57) ABSTRACT

Systems and methods are provided for determining and/or presenting supplemental content associated with media content. In some embodiments, supplemental content may include information regarding characters, places, events, and/or user generated data associated with media content. Supplemental content may be determined through the use of one or more indexes and/or data structures that relate media content with supplemental content items. User interfaces may be generated to present the supplemental content items in a particular order, layout, and/or streaming animation to provide context for the user. In some embodiments, the user interfaces including the supplemental content may be configured to receive user input for navigation of the media content.

24 Claims, 11 Drawing Sheets

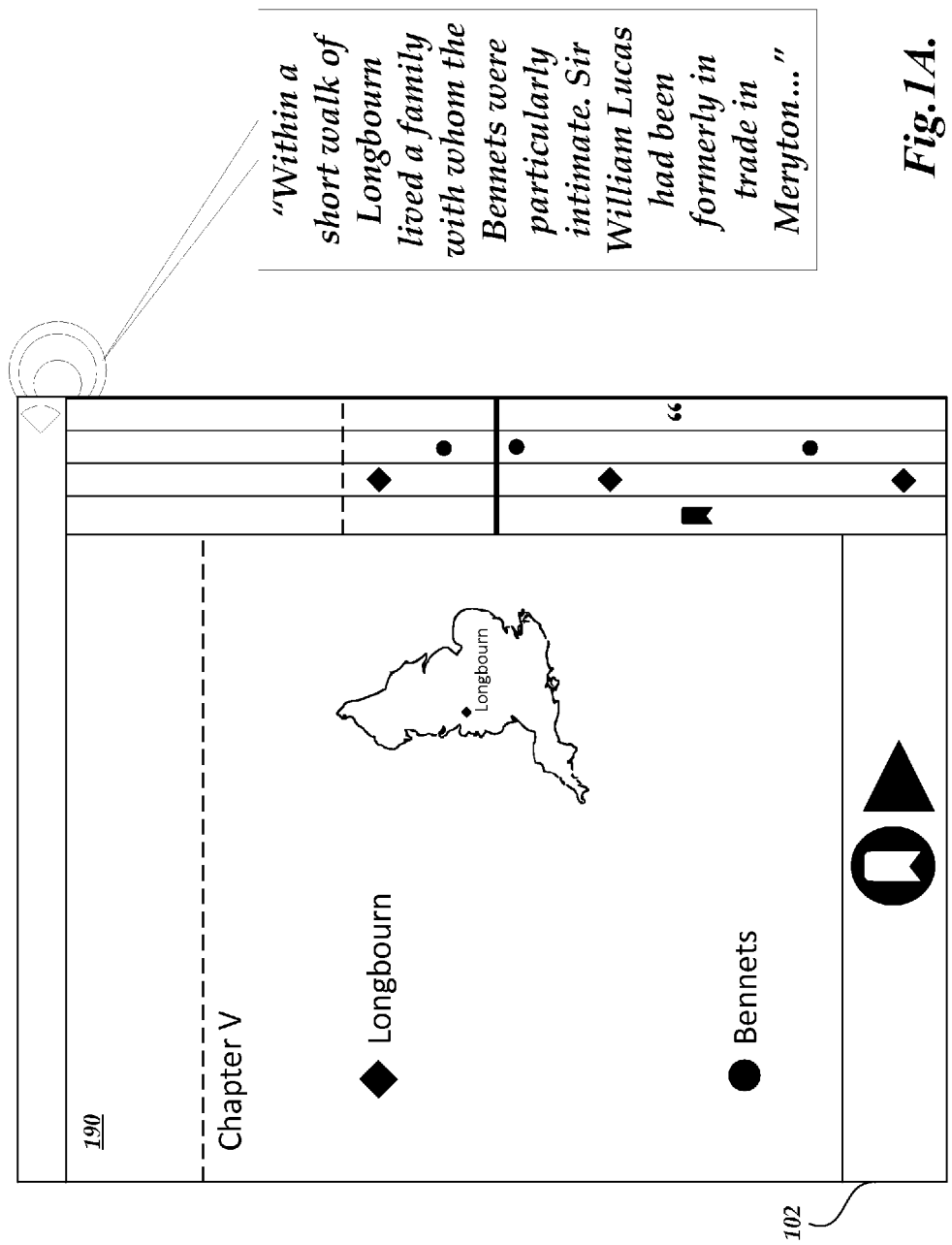

PRESENTING ANIMATED VISUAL SUPPLEMENTAL CONTENT

BACKGROUND

Generally described, computing devices may present various types of digital content to users for consumption. For example, computing devices may visually present items of content such as electronic books, movies, television programs and other multimedia content. Similarly, computing devices may aurally present content such as audiobooks, music, movies, and other multimedia content. Some computing devices display an image or album cover associated with the audiobook or audio during playback.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1A is a pictorial diagram of an illustrative user interface presented during playback of media content.

DETAILED DESCRIPTION

Figure 1B:
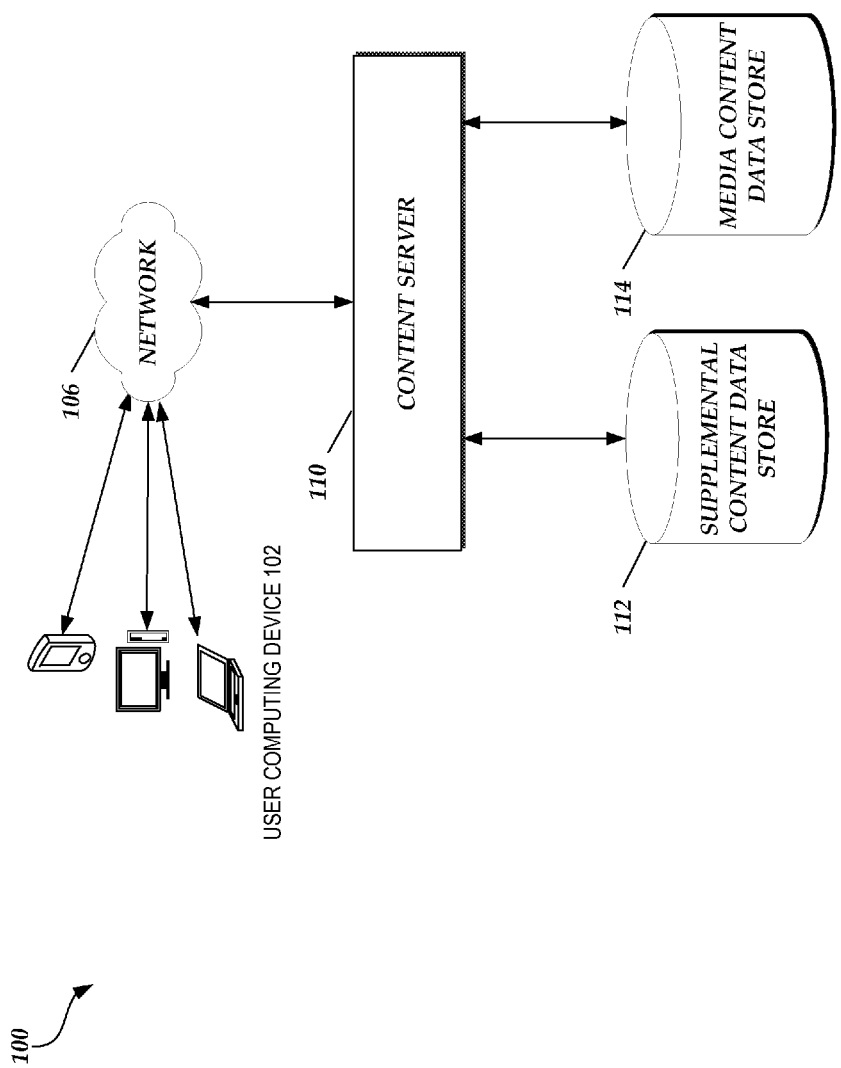
FIG. 1B is a schematic block diagram depicting an illustrative network environment for implementing a content service that determines visual and/or supplemental content for presentation during playback of media content.

Generally described, aspects of the present disclosure are directed to determining supplemental content associated with media content during playback of the media content, and/or presenting the determined supplemental content. For example, a user may use a personal computing device, such as a smartphone, to listen to an audiobook. Supplemental content may be determined regarding characters, locations, quotes, and/or user generated content that is related to the audiobook generally and/or related to particular positions within the audiobook. During playback of the audiobook, supplemental content that is synchronized with the playback of audiobook may be presented to the user. For example, visual graphics and/or icons associated with the supplemental content may be presented to the user, such as an image and/or icon of a fictional character when that fictional character is mentioned within the spoken words of the audiobook. One or more items of supplemental content may be presented to the user in a particular order and/or layout (e.g., presenting supplemental content associated with a character, plot event, and fictional location in that respective order corresponding to the order they are mentioned in the audiobook) that may enhance the user's comprehension of the audiobook. Furthermore, the user interface that visually displays supplemental content may also allow a user to navigate the audiobook by interacting with controls associated with the supplemental content. Thus, the user may be able to visualize and/or navigate the audiobook in a unique manner.

There may be advantages to determining supplemental content to be presented to a user and/or presenting the supplemental content concurrently with the playback of media content. Some media content may be difficult for a user to understand in one media format, such as a user exclusively listening to audio of an audiobook. For example, a book and/or a series of books may consist of numerous plot lines and/or characters, and/or are told from the perspective of numerous characters such that the one or more books may be confusing for a user to comprehend. Thus, supplemental content may be presented to the user that refreshes the memory about certain characters and/or aspects of the book that enrich user consumption of the book. Other advantages include the presentation of supplemental content as images and/or video content (e.g., displaying images from a children's book along with the corresponding audiobook), which is described in further detail below.

The term "supplemental content," as used herein, refers to any data and/or secondary content that is associated with the media and/or primary content being presented to the user. For example, where the primary content includes an audiobook, supplemental content may include data, images, and/or words related to characters, locations, events, author commentary, and/or background information associated with the primary content. Supplemental and/or secondary content may also include highlights and/or quotes of the primary media content. Supplemental content may also include icons, videos, links to other data (e.g., a hyperlink), user generated data, and/or other multimedia content associated with the primary content. For example, user generated may include comments from a user on a social network and/or notations from other users of a small group.

According to other aspects of the present disclosure, a content service is described that may determine visual and/or supplemental content for presentation during playback of media content. For example, the content service may identify and/or determine supplemental content related to text words and/or phrases of an audiobook. In some embodiments, the determined supplemental content may be based at least in part on user preferences, group associations, social network groups, and/or user history associated with the media content.

In some embodiments, the words for given portions of media content (such as audio content of an audiobook) may be determined based at least in part on a corresponding or related item of textual content (such as textual content of an electronic book ("ebook") version of the same underlying book). An item of textual content and a corresponding item of audio content are sometimes referred to herein as "associated" or "companion" content. An item of audio content and a corresponding item of associated textual content may be synchronized with one another for simultaneous presentation. For example, a computing device implementing the content service may be provided with content synchronization information that maps one or more words in the item of associated textual content with a position of an identical word or words in the item of audio content (e.g., the identical word or words that are spoken, sung, recited, etc. in the item of audio content). In some embodiments, the synchronization information may indicate time positions and/or data locations within associated audio content that correspond to word, paragraph, chapter, section, or other positions within the textual content. For example, chapters of an ebook may be associated with start and/or end times of a chapter in the audiobook. More information regarding synchronizing an item of audio content with an item of associated textual content, as well as content synchronization information that may be stored in association with the synchronization, may be found in U.S. patent application Ser. No. 12/273,473 ("the '473 application"), filed Nov. 18, 2008, entitled "SYNCHRONIZATION OF DIGITAL CONTENT," which is hereby incorporated by reference in its entirety. An example of associated content, as used herein, may include various representations of content discussed in the '473 application. Furthermore, the associated textual content may be further synchronized and/or associated with supplemental content, which is described in further detail below.

In some embodiments, a content module (when executed by one or more hardware processors), as disclosed herein, may cause a computing device to determine supplemental content and/or display the determined supplemental content. During playback of the media content by the computing device, the content module may determine and/or retrieve supplemental content based on text data associated with the media content and/or a current playback position of the media content. In some embodiments, the presentation of supplemental content may be automatically generated and/or initiated by user input during playback of the media content.

A content service, as disclosed herein, may be implemented in any of a number of environments in which media content is presented. In some embodiments, the content service may be implemented as an application executed on a user computing device configured to present visual and/or audio content. A user interface to present supplemental content and/or navigate the media content may be provided by the user computing device as the application is executed. In other embodiments, the content service may be implemented via a content page hosted by a content server on a network. The content page may be accessed by a user computing device via a network resource browser. A user interface for requesting supplemental content data associated with the media content may be provided on the content page, and the media content may be streamed and/or downloaded from the content server to the user computing device for presentation thereon. Other implementations are possible in different embodiments.

While reference is frequently made herein to audiobooks, books, ebooks, etc., it will be appreciated that media content may include any type of content that is presented continuously over time and that may be associated with supplemental content. Examples of continuously presented media content may include audiobooks, podcasts, news programs, musical works, television programs, video clips, movies, multimedia content, video games, and any other type of content having related supplemental content that enhances user consumption of the media content. For example, as disclosed herein, a primary display of a computing device or computing system may include video content and/or a secondary display of the computing device or computing system may include the streaming supplemental content, which is synchronized with the primary video content. Media content can also include any type of textual content, such as an ebook, electronic table of contents, closed caption content, screenplay, script, libretto, transcription (e.g., speech-to-text) or other textual content. As will be appreciated, in some embodiments, textual content representing words spoken in various types of audio content may be determined dynamically using speech recognition and/or other known methods. As will be appreciated, sections of media content may refer to the chapters of a book, episodes of a show, sections of a show defined by advertising and/or commercial breaks, books in a collection, and/or any other type of ordered arrangement of content that may be broken into discrete sections. Section markers may be automatically extracted from the media content itself and may be presented to the user along with and/or as supplemental content to provide additional context to the user. For example, where an audiobook includes audio content such as, "start of chapter ten," section markers may be determined dynamically by analyzing the audio content for certain keywords, indicators, phrases, pauses, etc., which may then be visually presented to the user.

FIG. 1A illustrates an example user interface presented during playback of media content. As illustrated in FIG. 1A, user interface 190 may be displayed on user computing device 102. User computing device 102 may aurally present media content corresponding to words via one or more speakers and/or one or more audio outputs. User interface 190 may present supplemental content synchronized with the playback of media content. Depending on the embodiment, user interface 190 may be generated at least in part by the user computing device 102 and/or the content server 110, which are described in further detail below. Elements of user interface 190, such as the supplemental content, may be generated by the content module 216 and/or by the illustrative methods 300 and/or 400, which are described in further detail below. Furthermore, elements and/or features of user interface 190 may be similar to the elements and/or features of user interface 500 of FIGS. 5A-D and/or user interface 600 of FIGS. 6A-B, which are described in further detail below.

Turning to FIG. 1B, an illustrative network environment 100 is shown in which a content service may determine visual and/or supplemental content for presentation during playback of media content. The network environment 100 may include a user computing device 102, a network 106, a content server 110, a supplemental content data store 112, and a media content data store 114. The constituents of the network environment 100 may be in communication with each other either locally or over the network 106.

The user computing device 102 may be any computing device capable of communicating over the network 106 and presenting media content to a user, such as a laptop or tablet computer, personal computer, personal digital assistant (PDA), hybrid PDA/mobile phone, mobile phone, smartphone, wearable computing device, global positioning system (GPS) device, electronic book reader, set-top or other television box, camera, audiobook player, digital media player, video game console, in-store kiosk, television, appliance, electronic device for inclusion in vehicles or machinery, gaming device, or the like. In some embodiments, user interfaces shown in FIGS. 1A, 5A-D, and/or 6A-B, may be presented on user computing devices 102.

The user computing device 102 may generally be capable of presenting audio and visual content to a user of the user computing device 102. For example, the user computing device 102 may be capable of playing audio content by directing audible or aural output through speakers, headphones, or the like. In some embodiments, the user computing device 102 may also be capable of presenting images, video content, text, user interfaces, and/or user interface controls on a display screen. The user computing device 102 may further be capable of receiving user input through a user input device, such as a keyboard, mouse, touchpad, microphone, trackball, touchscreen, image recognition through an input camera (e.g., eye, hand, head, body tracking and/or placement), gamepad, accelerometer, gyroscope, or other input device known in the art.

The user computing device 102 may further be capable of accessing network resources, such as content pages, via the network 106. In some embodiments, continuously presented media content may be presented through these content pages by the user computing device 102, e.g., by media content and/or supplemental content being streamed over the network 106 to the user computing device 102. In other embodiments, media content and/or supplemental content presented by the user computing device 102 may be retrieved from a data store that is local to the user computing device 102.

In some embodiments, the user computing device 102 stores one or more items of audio content, textual content, associated content, supplemental content, and/or other media content in an electronic data store. For example, the user computing device 102 may include one or more hard disk drives, solid state memories, and/or any other type of non-transitory computer readable storage medium accessible to or integrated within the user computing device 102. These items may be retrieved from storage and conveyed by the user computing device 102 to the user.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. Protocols and components for communicating via the Internet or any of the other aforementioned types of communication networks are well known to those skilled in the art of computer communications and thus, need not be described in more detail herein.

In some embodiments, the content server 110 includes a computing device that may perform a variety of operations to implement a content service. For example, the content server 110 may retrieve media content from the media content data store 114, which is described in further detail below. The content server 110 may determine visual and/or supplemental content, including the layout and/or order of such content, for presentation during playback of media content. In some embodiments, the content server 110 may access the supplemental content data store 112, which is described in further detail below, to retrieve data to supplement and/or add context to the media content. Also as described in further detail below, the content server may retrieve supplemental content data from data sources via the network 106, such as social network data related to media content. In some embodiments, a supplemental content service (not illustrated) may be implemented to access the supplemental content data store 112 and/or other data stores to provide supplemental content data. As described in further detail below, a supplemental content service may provide an Application Programming Interface ("API") for retrieving supplemental content data at various levels of abstraction. Additional operations of the content server 110 are described below with respect to FIG. 2.

The supplemental content data store 112 may electronically store, in some embodiments, supplemental and/or contextual data associated with media content, as further discussed below. The supplemental content data store 112 may be embodied in hard disk drives, solid state memories, any other type of non-transitory computer-readable storage medium, and/or a file, a database, a relational database, stored in any such non-transitory computer-readable media accessible to the content server 110. The supplemental content data store 112 may also be distributed or partitioned across multiple local and/or storage devices without departing from the spirit and scope of the present disclosure. In some embodiments, the supplemental content data store 112 is a data storage web service.

The content server 110 may also be in communication with a media content data store 114. The media content data store 114 may electronically store items of media content, such as audiobooks, podcasts, news programs, musical works, ebooks, television programs, video clips, movies, multimedia content, video games, and/or other types of content. In some embodiments, the media content data store 114 may be embodied in various types of non-transitory computer readable storage similar to the supplemental content data store 112. In some embodiments, the supplemental content data store 112 and/or the media content data store 114 may store associated or companion content to the multimedia content being presented, such as an ebook and/or text file corresponding to an audiobook.

The user computing device 102 and content server 110 may each be embodied in a plurality of devices. The user computing device 102 and/or content server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content server 110 may be represented in a single physical server or, alternatively, may be split into multiple physical servers. In some embodiments, the entire content service may be represented in a single computing device, such as user computing device 102. Additionally, the environment 100 may not include a network 106.

In some embodiments, user computing device 102 may operate in an off-line mode and/or be disconnected from the network 106 for periods of time. For example, user computing device 102 may initially synchronize and/or download content from the content server yet network 106. User computing device 102 may then be optionally disconnected from network 106 and a user may consume the media and/or supplemental content in an off-line mode. As described in further detail below, a user may optionally generate supplemental content to be shared with other users. Accordingly, such user generated supplemental content may be generated by the user while user computing device 102 is in an off-line mode. The user generated supplemental content may be shared with content server 110 when user computing device 102 is reconnected to network 106. Furthermore, user computing device 102 may receive updated content and/or supplemental content from content server 110 when user computing device 102 is reconnected to the network 106. Therefore, user computing device 102 and/or the content server may operate in an asynchronous manner for sharing and/or distributing content.

Additionally, in some embodiments, the content service is implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

Figure 2:
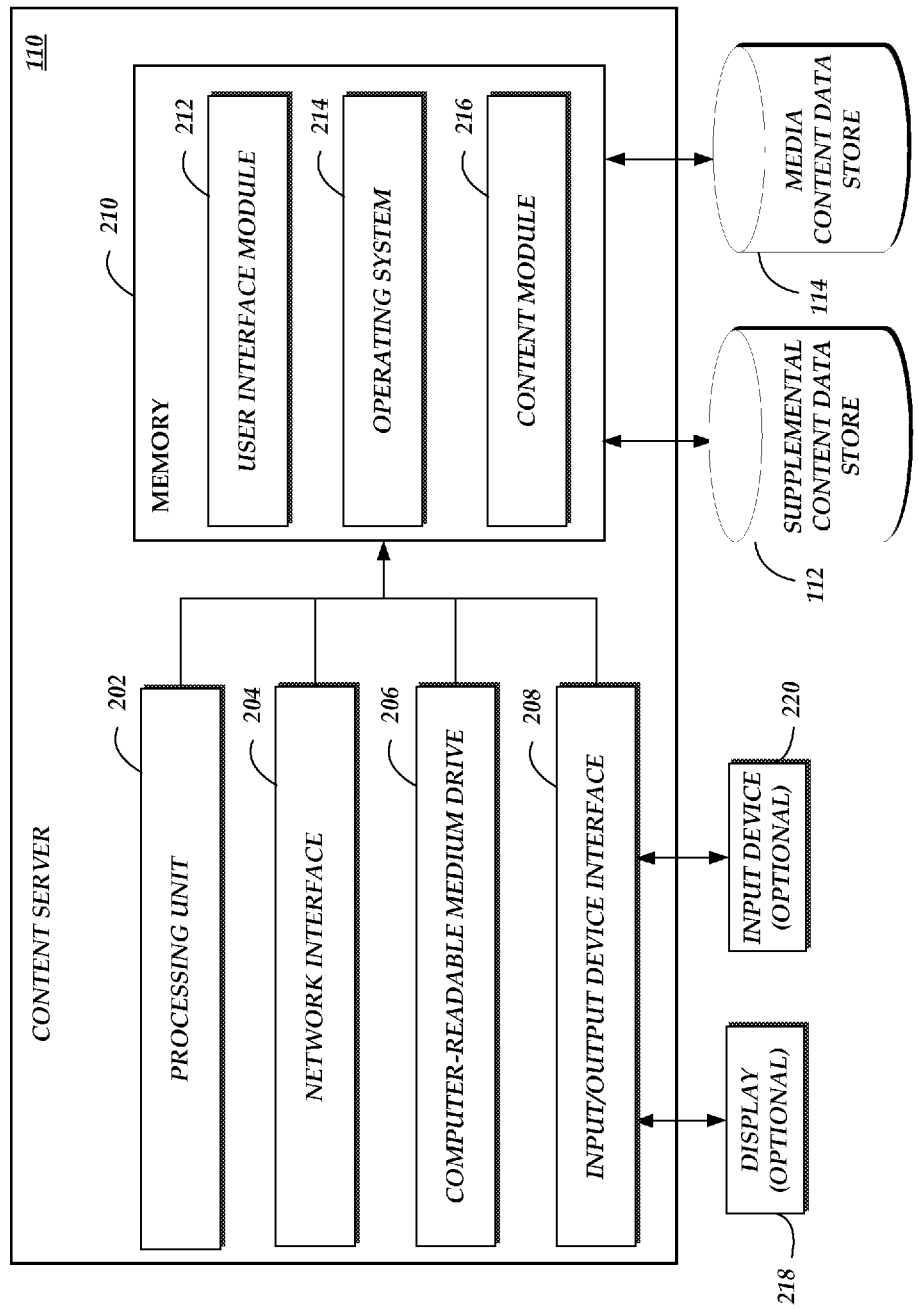
FIG. 2 is a schematic block diagram depicting an illustrative content server of the network environment depicted in FIG. 1B.

FIG. 2 is a schematic diagram of the illustrative content server 110 shown in FIG. 1B. The content server 110 includes an arrangement of computer hardware and software components that may be used to implement the content service. FIG. 2 depicts a general architecture of the content server 110 illustrated in FIG. 1B. Those skilled in the art will appreciate that the content server 110 may include more (or fewer) components than those shown in FIG. 2.

The content server 110 may include a processing unit 202, a network interface 204, a non-transitory computer-readable medium drive 206, and an input/output device interface 208, all of which may communicate with one another by way of a communication bus. As illustrated, the content server 110 is associated with, or in communication with, an optional display 218 and an optional input device 220. The display 218 and input device 220 may be used in embodiments in which users interact directly with the content server 110, such as an integrated in-store kiosk or integrated component for inclusion in an automobile, boat, train, or airplane, for example. In other embodiments, the display 218 and input device 220 may be included in the user computing device 102 shown in FIG. 1B. The network interface 204 may provide content server 110 with connectivity to one or more networks or computing systems. The processing unit 202 may thus receive information and instructions from other computing systems (such as the user computing device 102) or services via network 106. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the processing unit 202 executes in order to implement one or more embodiments of the content service. The memory 210 generally includes RAM, ROM and/or other persistent or non-transitory computer-readable storage media. The memory 210 may store an operating system 214 that provides computer program instructions for use by the processing unit 202 in the general administration and operation of the content server 110. The memory 210 may further include other information for implementing aspects of the content service. For example, in one embodiment, the memory 210 includes a user interface module 212 that facilitates generation of user interfaces (such as by providing instructions therefor) for display upon a computing device, such as the user computing device 102. For example, a user interface may be displayed via a browser implemented by the user computing device 102. In addition, the memory 210 may include or communicate with the supplemental content data store 112 and/or media content data store 114.

In addition to the user interface module 212, the memory 210 may include a content module 216 that may be executed by the processing unit 202. In some embodiments, the content module 216 may implement various aspects of the present disclosure. For example, the content module 216 may determine supplemental content data to be displayed with the media content, provide instructions for presentation of the supplemental content data and/or content data at the user computing device 102, interface with a supplemental content service to retrieve supplemental content data, and/or other aspects of the disclosure described herein. The content module 216 may retrieve supplemental content data and/or items of supplemental content from the supplemental content data store 114. In some embodiments, the content module 216 may communicate and/or provide instructions to the user interface module 212 to provide a determined set of user interface controls. Additionally, the content module 216 may retrieve an item of media content and/or media content data from the media content data store 114. The user computing device 102 may locally store or stream the item of media content, media content data, and/or supplemental content provided by the content module 216.

While the content module 216 is illustrated as implemented by the content server 110, in other embodiments, the content service may be implemented partially or entirely by the user computing device 102. For example, the content service may be provided as specifically configured hardware and/or specifically configured application software implemented by hardware on the user computing device 102. Accordingly, the user computing device 102 may include the content module 216 and other components that operate similarly to the components illustrated as part of the content server 110, including a processing unit 202, network interface 204, non-transitory computer-readable medium drive 206, input/output interface 208, memory 210, user interface module 212, and so forth.

Figure 3:
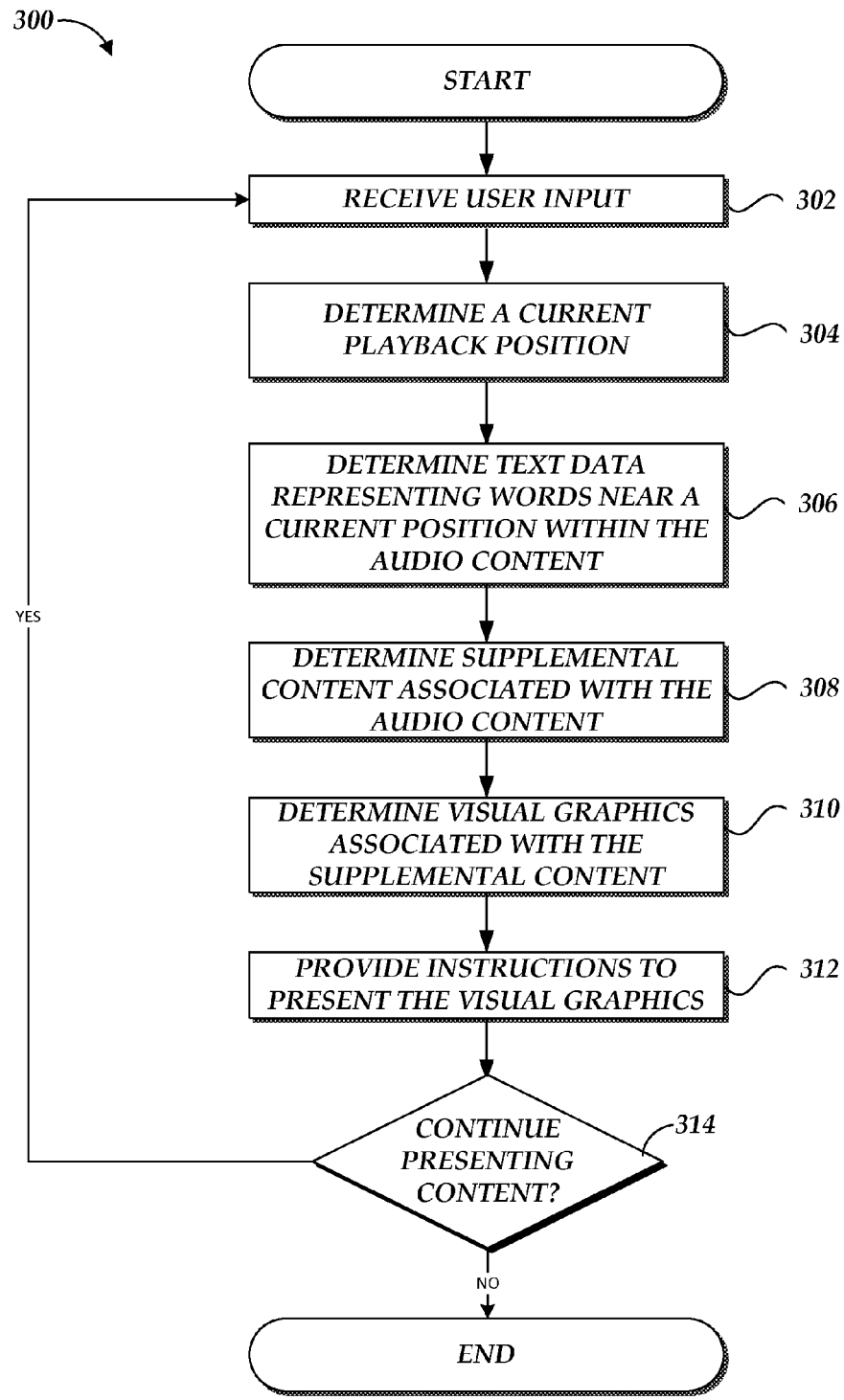
FIG. 3 is a flow diagram depicting an illustrative method for determining visual and/or supplemental content for presentation during playback of media content.

FIG. 3 is a flow diagram depicting an illustrative method 300 implemented by the content module 216 for determining supplemental content for presentation during playback of media content. As discussed above, in some embodiments, the content server 110 may include the content module 216. In other embodiments, the user computing device 102 may include the content module 216, and may implement illustrative method 300 without any content server being needed. In yet other embodiments, functions of the content module 216 may be distributed between the user computing device 102 and the content server 110.

Illustrative method 300 begins at block 302, where the content module 216 receives user input. For example, the user input may be received as a result of user interaction with the user computing device 102 (e.g., tapping a touchscreen of the device) and/or other input mechanisms available to a user during playback of media content, as discussed in more detail with reference to FIGS. 5A-5D, and/or 6A-6B. User input may be received via user interface controls to navigate the media content, to add and/or generate supplemental content, and/or to select additional content to be presented to the user. User input may include data to start the playback of the media content and/or to change the current playback position of the media content. In some embodiments, receipt of user input may be optional. For example, playback of media content may initiate automatically without the receipt of user input and/or user interaction data.

After user input is received, the content module 216, at block 304, determines a current playback position of the media content. In some embodiments, the current playback position may be determined based on a current playback time and/or other data. For example, the current playback time may be one minute thirty seconds, which may be stored as a variable and/or in some other data format by the content module 216. The content module may update the current playback time based on an elapsed time and/or subsequent user input to stop, pause, fast forward, and/or rewind the media content. The current playback time may be stored and/or tracked to the millisecond, microsecond, and/or some other time unit. In some embodiments, the current playback position may be determined by an index, word position, and/or by using associated content, such as textual content. For example, a current word position may be word 100 out of 123,880 words of a book. Similar to the embodiments where the current playback time may be updated based on user input and/or other data, a current playback position by word may be updated based on user input and/or other data. Other data may include a command and/or signal to stop, pause, fast forward, and/or rewind the media content, but that is not user generated, such as a command to stop the current playback position after a timeout period or when the end of the media content playback is reached.

At block 306, the content module 216 determines text data representing words near the current playback position within the media content. The content module 216 may retrieve text data representing words spoken within the audio content being played. For example, the text data associated with an audiobook may be retrieved from a synchronization and/or mapping file stored in the media content data store 114. In some embodiments, the mapping file may include time units that correspond to each word of the text data. The content module 216 may use a configurable window to retrieve the words near the current playback position that was determined at block 304. In some embodiments, the configurable window may be associated with the supplemental content that is presented to the user. For example, where the configurable window of time is sixty seconds, the content module 216 may retrieve all words within thirty seconds before of the current playback position and thirty seconds after the current playback position. In an illustrative example where the current playback position is two minutes, text words corresponding to one minute and thirty seconds to two minutes and thirty seconds of the audio content may be retrieved. The content module 216 may determine all or some of the words within the configurable time window by using the current playback position time and/or the mapping filing, which may include words indexed by time. It will be appreciated that determining text area near a current playback position may be determined by some other mechanism than time, such as determining text data by word position and/or a word index. In some embodiments, the configurable content window may change based on user input, such as, zooming in and/or out of the presentation area and/or other user navigation, which is described in further detail below. For example, the configurable content window may be before or after the current playback position, and/or some combination thereof.

At block 308, the content module 216 determines supplemental content associated with the media content. In an illustrative example, supplemental content may be stored in the supplemental content data store 112. In some embodiments, supplemental content may be identified by looking up and/or retrieving content from network resources based on words and/or phrases from the text data of an audiobook, such as retrieving an article regarding a fictional character from a network resource. In some embodiments, natural language processing, computational linguistics, and/or n-grams may be used to identify supplemental by comparing text data from media content against one or more data sources of supplemental content, which is described in further detail below. Other methods and/or techniques for identifying supplemental content may be found in U.S. patent application Ser. No. 13/433,028, filed Mar. 28, 2012, entitled "IDENTIFYING TOPICS IN A DIGITAL WORK," which is hereby incorporated by reference in its entirety. The content module may create and/or access a data structure including the supplemental content, such as a data structure that indexes the supplemental content by word and/or position. More information regarding retrieving supplemental content may be found in U.S. patent application Ser. No. 13/246,759, ("the '759 application"), filed Sep. 27, 2011, entitled "PROVIDING SUPPLEMENTAL INFORMATION FOR A DIGITAL WORK," which is hereby incorporated by reference in its entirety. For example, the characters of an audiobook and their corresponding supplemental content may be indexed by character name, such as, "Bob," "John," "Sally," and/or a unique identifier for each character. Other supplemental content may include places, background information, events, themes, commentary, sand/or other words and/or phrases associated with the media content, which may be indexed. Thus, supplemental content may be determined by performing lookups for each word and/or phrase of the text data determined at block 306. Other techniques and/or methods for determining supplemental content are described in further detail with reference to FIG. 4.

At block 310, the content module 216 determines visual graphics and/or metadata associated with the determined supplemental content. For example, each item of supplemental content may have a corresponding content type. Example content types include location, character, quotes, and/or notes. Each content type may have corresponding metadata, visual graphics, and/or icons. The visual graphics may be presented to the user in a user interface to visualize the supplemental content during playback of the media content. Examples of visual graphics associated with supplemental content are described in further detail with reference to FIGS. 5A-5D and 6A-6B.

At block 312, the content module 216 provides instructions to present the determined visual graphics and/or supplemental content. For example, each item of supplemental content may be associated with a time, position, and/or visual graphic. Thus, the supplemental content may be presented in an order and/or timeline that visually illustrates the supplemental content to a user. For example, a section of an audiobook may discuss a protagonist, an important fictional event, and a fictional location, in that respective order. Thus, an order and/or layout of the visual graphics associated with the protagonist, event, and location may be presented to the user based at least in part on the respective time positions of each of those supplemental content topics. In some embodiments, the supplement content and/or visual graphics may be animated to a user as the current playback position updates and/or changes. The animation may occur as a result of the potential loop at block 314 and/or for specific instructions to display the visual graphics and/or supplemental content at particular locations in the user interface (e.g., X, Y coordinates of the display and/or user interface). The presentation of the supplemental content is discussed in more detail below with reference to FIGS. 5A-5D and 6A-6B.

At block 314, the content module 216 determines whether to continue presenting content. For example, if the current playback position has reached the end of an audiobook, then additional supplemental content may not be displayed and/or the loop will end. However, if playback was not been paused and/or stopped and the current playback position is not at the end of the audiobook, then the method may return to block 302. The content module may update the current playback position by a particular variable, and/or configurable time unit. For example, the current playback time may be updated from two minutes to two minutes and one second/millisecond/etc. Thus, the loop may be repeated with a current playback time of two minutes and one second/millisecond/etc., which may result in an animation of the supplemental content, such as a change in the relative positions of the supplemental content to present a streaming and/or flowing user interface.

Figure 4:
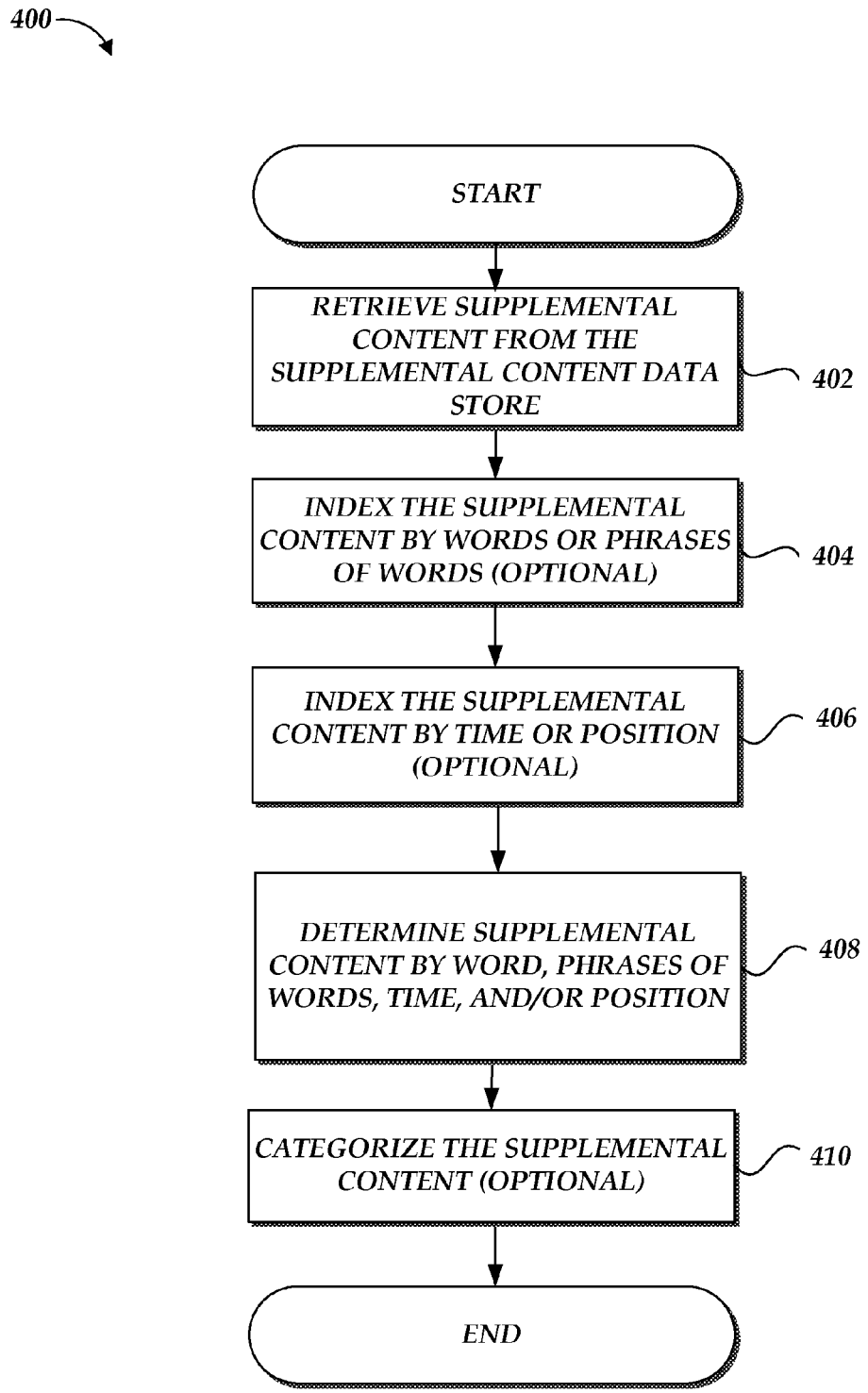
FIG. 4 is a flow diagram depicting another illustrative method for determining visual and/or supplemental content for presentation during playback of media content.

FIG. 4 is a flow diagram depicting another illustrative method 400 implemented by the content module 216 for determining supplemental content for presentation during playback of media content. In some embodiments, similar to illustrative method 300, the user computing device 102 may include the content module 216, and may implement illustrative method 400 without any content server being needed. In other embodiments, the user computing device 102 may include the content module 216, and may implement illustrative method 400 without any content server being needed. In yet other embodiments, functions of the content module 216 may be distributed between the user computing device 102 and the content server 110. Some of the blocks of illustrative method 400 may be implemented by the content module 216 to determine supplemental content to be presented to a user during playback of the media content. Thus, some of the blocks of illustrative method 400 may be similar to block 308 of FIG. 3 described above. For example, some of the features and/or functions of illustrative method 400 may be implemented by a supplemental content service that may be called by the content service and/or content module 216. The supplemental content service may include an API that provides an interface for the content module 216 to retrieve supplemental content by word, phrases of words, time, and/or position within the media content. The API of the supplemental content service may also expose an interface for a subscriber to receive notifications and/or updates to supplemental content (e.g., social network messages and/or notifications associated with media content).

At block 402, the content module 216 retrieves supplemental content from the supplemental content data store 112. Supplemental content may be stored in the form of textual data, images, videos, binaries, characters, and/or other data formats. Supplemental content may be indexed and/or stored by a media content name, identification number, and/or media content type. In one example, supplemental content may be retrieved for a particular work such as "Pride and Prejudice." In some embodiments, all of the supplemental content for a particular work and/or media content may be retrieved. In other embodiments, supplemental content may be retrieved selectively based on the textual data near a current playback position. Other techniques for retrieving supplemental content by word, phrase, index, and/or other methods is described in further detail below. In some embodiments, the content module 216 may optionally determine and/or retrieve supplemental content based on user preferences and/or user data. For example, a user may have specified that a particular supplemental content type is preferred and/or subscribed to a particular group for supplemental content related to the media content. In some embodiments, a user may have generated notes associated with the media content, which may be loaded by the content module 216.

In some embodiments, supplemental content may be ranked, scored, and/or prioritized. For example, users may vote on supplemental content they liked and/or found useful. Thus, votes may be stored and/or provided with the supplemental content such that the content module 216 may select the most popular and/or highest priority supplemental content. As will be described in further detail below, the user interface may provide multiple levels and/or views of the supplemental content. As a result, the highest ranked and/or scored supplemental content may surface before lower ranked supplemental content based on the view and/or level of the user interface. In some embodiments, supplemental content rankings may be determined based on word/phrase frequency and/or natural language processing to determine main characters and/or important topics.

At block 404, the content module 216 may optionally index the supplemental content by words and/or phrases of words. Each item of supplemental content retrieved from the supplemental content data store 112 may be associated with a word, phrase, name, title, topic, summary, and/or other metadata. Example names of supplemental content may include: "Elizabeth Bennet," "Sir William Lucas," "Longbourn," etc. Each item of supplemental content may be indexed using a data structure, such as, a hash map, which may store each item of supplemental content by name, identification number, and/or title, for example. In some embodiments, items of supplemental content may include data objects, which conform to an object-orientated programming approach. More information regarding retrieving supplemental content from data objects and/or structures may be found in the '759 application.

At block 406, the content module 216 may optionally index the supplemental content by time and/or position. Textual content associated with media content may be determined based on a current playback position and/or retrieved from a mapping file as described above. In one example, for each word and/or phrase of textual data, a lookup and/or retrieval may be performed against the supplemental content data store 112. Determining phrases of multiple words, such as "Sir William Lucas," from textual data may occur by one or more techniques such as natural language processing, computational linguistics, and/or determining n-grams. For example, for a portion of textual content, word groupings of two words, three words, four words, n words, etc. may be generated to lookup and/or retrieve supplemental content. Example three word groupings may include, "family with whom," "whom the Bennets," "Sir William Lucas," etc. Each of the word groupings may be compared against data in the supplemental content data store 112 to determine supplemental content and/or corresponding word positions of supplemental content within the textual data. Additionally, the textual data may be associated with time units and/or positions, as described above, to determine times and/or positions for the items of supplemental content. Thus, supplemental content may be indexed in a data structure by time and/or position with respect to the media content. Non-limiting example data structures for indexing supplemental content by time and/or position includes arrays, maps, hash maps, linked lists, and/or other data structures that may indicate an order of items and/or objects. In some embodiments, the supplemental content data store 112 may store and/or cache the time and/or position of each item of supplemental content.

At block 408, the content module 216 determines supplemental content by word, phrase, time, and/or position. For example, supplemental content may be retrieved from the index of words and/or phrases of supplemental content based on the determined text data near a current playback position, as described above. In some embodiments, supplemental content near a current playback time and/or position may be retrieved based on the corresponding data structure that indexes supplemental content by time and/or position. As described above, a supplemental content service may implement some of the methods described by illustrative method 400 to expose an API to retrieve supplemental content by word, phrase, time, and/or position. One illustrative method of the API may be to retrieve supplemental content by time/position and an optional configurable window. In other words, the API may receive a time/position and an optional window to return supplemental content, e.g., a thirty second, one hundred words, or default window. Advantageously, a module or service invoking the API may be agnostic to the underlying techniques and/or mechanisms of the supplemental content service and the underlying techniques and/or mechanisms of the supplemental content service may be changed and/or updated at a later time.

In some embodiments, a supplemental content service may be configured to share user generated content among multiple users. For example, a supplemental content service may be integrated with one or more social networks to receive user generated content associated with media content. For example, a user applying a particular tag to a message and/or comment, such as, "#prideandprejudice," may share the message and/or comment as supplemental content through the supplemental content service. In some embodiments, votes and/or rankings of the most popular user generated comments may be used to select supplemental content to be shared. The supplemental content service may implement a push, notification, and/or event mechanism to publish messages and/or events to the content module regarding particular media content. For example, a user consuming the media content may post a social network message associated with the media content and/or comment on the media content at a particular playback time, which may then be shared with other users. In some embodiments, the particular social network comment may be presented at the particular playback time of the original author of the comment to other users consuming the same media content. In some embodiments, users may join a group to share supplemental content with each other. For example, in a small group reading and/or book club, users may join the same group via the content module 216 to share comments, highlights, annotations, and/or messages, regarding the same media content. Thus, users of the same group may see comments from other users, which may be described and/or illustrated with reference to FIG. 5C. In some embodiments, user generated supplemental content may include content from small groups and/or social network messages from the general population of users consuming the same media content, which may be filtered and/or selected by votes and/or rankings. The user generated supplemental content may be tagged and/or associated with particular time and/or positions in the media content. Thus, when the content module 216 requests supplemental content by time and/or word position, recent and/or the latest user generated supplemental content may be retrieved. In some embodiments, the content module 216 may refresh and/or retrieve new supplemental content by time and/or position based on automatic periodic refreshes and/or user initiated updates.

At block 410, the content module 216 may optionally categorize and/or retrieve categories for the supplemental content. In some embodiments, supplemental content categories and/or content types may be based on the source of the supplement content and/or other metadata. For example, user generated comments from a social network may be automatically categorized as a note and/or comment type of supplemental content. The data sources for information regarding characters, places, and/or other information associated with media content may include categories that the content module 216 may convert into supplemental content types. In some embodiments, natural language processing and/or computational linguistic techniques may be applied to determine content types for supplemental content, such as categorizing supplemental content as regarding a person, place, event, etc. In some embodiments, a human may manually categorize supplemental content and the categorized supplemental content may be stored in the supplemental content data store 112. Other supplemental content types and/or categories are described in further detail with reference to FIGS. 5A-D and 6A-B.

FIGS. 1A, 5A-D, and 6A-B, illustrate example user interfaces with various user interface controls, according to some embodiments of the present disclosure. Alternate implementations are included within the scope of the embodiments described herein that provide for different variations of user interface controls from the user interface controls that are shown or discussed.

Figure 5A:
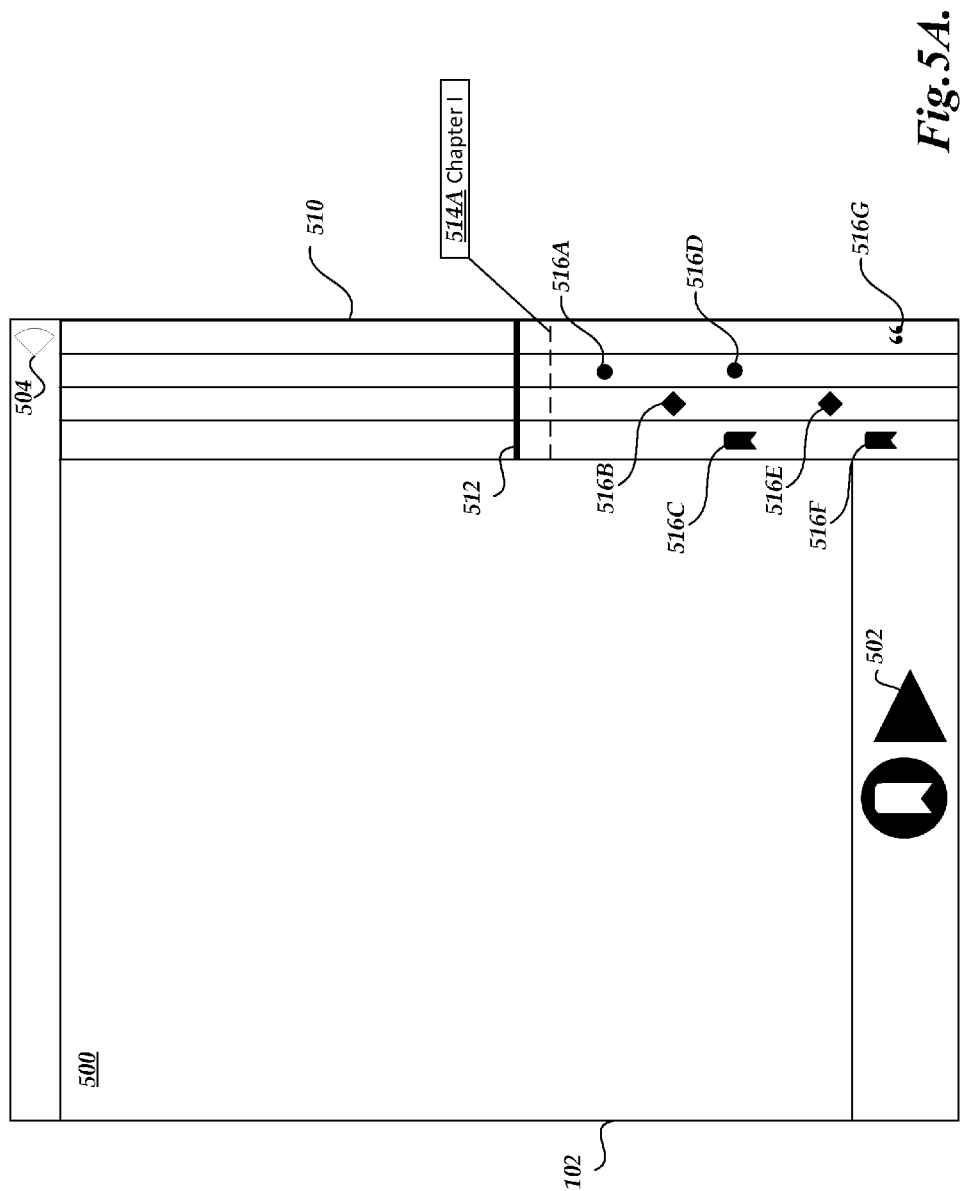
FIG. 5A is a pictorial diagram of an illustrative user interface presented during playback of media content that includes a layout of visual graphics corresponding to supplemental content at a playback position.

FIGS. 5A-D illustrate an example sequence of representations for user interface 500 presented during playback of media content. As illustrated in FIG. 5A, user interface 500 may be displayed on user computing device 102. The user interface may be generated at least in part by the user computing device 102 and/or the content server 110, depending on the embodiment. Elements of user interface 500, such as the supplemental content, may be generated by the content module 216 and/or by the illustrative methods 300 and/or 400. User computing device 102 may aurally present audio corresponding to words via one or more speakers 504 and/or one or more audio outputs, which may be provided to speakers or headphones. Example user interface 500 additionally includes a start/pause control 502 and/or a timeline navigator 510, which will be described in further detail below. In some embodiments, example user interface 500 may include highlighting tools, quote selection tools, and/or other user interface controls, which are not illustrated.

Example user interface 500 includes timeline navigator 510 that may present visual elements and/or graphics corresponding to supplemental content. Timeline navigator 510 may include elements that allow a user to visualize supplemental content associated with media content, among other functions that are described in further detail below. For example, timeline navigator 510 includes a playhead 512, chapter and/or section marker 514A, and/or timeline markers 516A-G. Playhead 512 may illustrate the positions of supplemental content relative to the current playback position. For example, the current playback position corresponding to user interface 500 of FIG. 5A may be before content playback has started and/or at time zero. Thus, playhead 512 is illustrated before the section marker 514A, which may correspond to "Chapter One" of the media content. Timeline markers 516A-G may be presented in a layout, timeline, and/or order corresponding to the relative positions of the respective supplemental content associated with the media content. Timeline marker 516A may correspond to supplemental content regarding a character referenced in the media content at a particular position in the media content. Timeline marker 516G may correspond to supplemental content regarding a popular quote in the media content at a particular position in the media content. Thus, timeline marker 516A may indicate that the supplemental character content associated with timeline marker 516A occurs before the supplemental quote content associated with timeline marker 516G. As illustrated in FIG. 5A, the timeline navigator 510 may provide a historical view, a timeline, and/or an overview of the relative positions of supplemental content in the media content with respect to the current content playback position.

In some embodiments, the play/pause control 502 starts, stops, pauses, activates, and/or controls the playback of the media content. As will be described in further detail below, elements of the timeline navigator 510 and/or user interface 500 may update, change, and/or animate as the current playback positions updates.

Figure 5B:
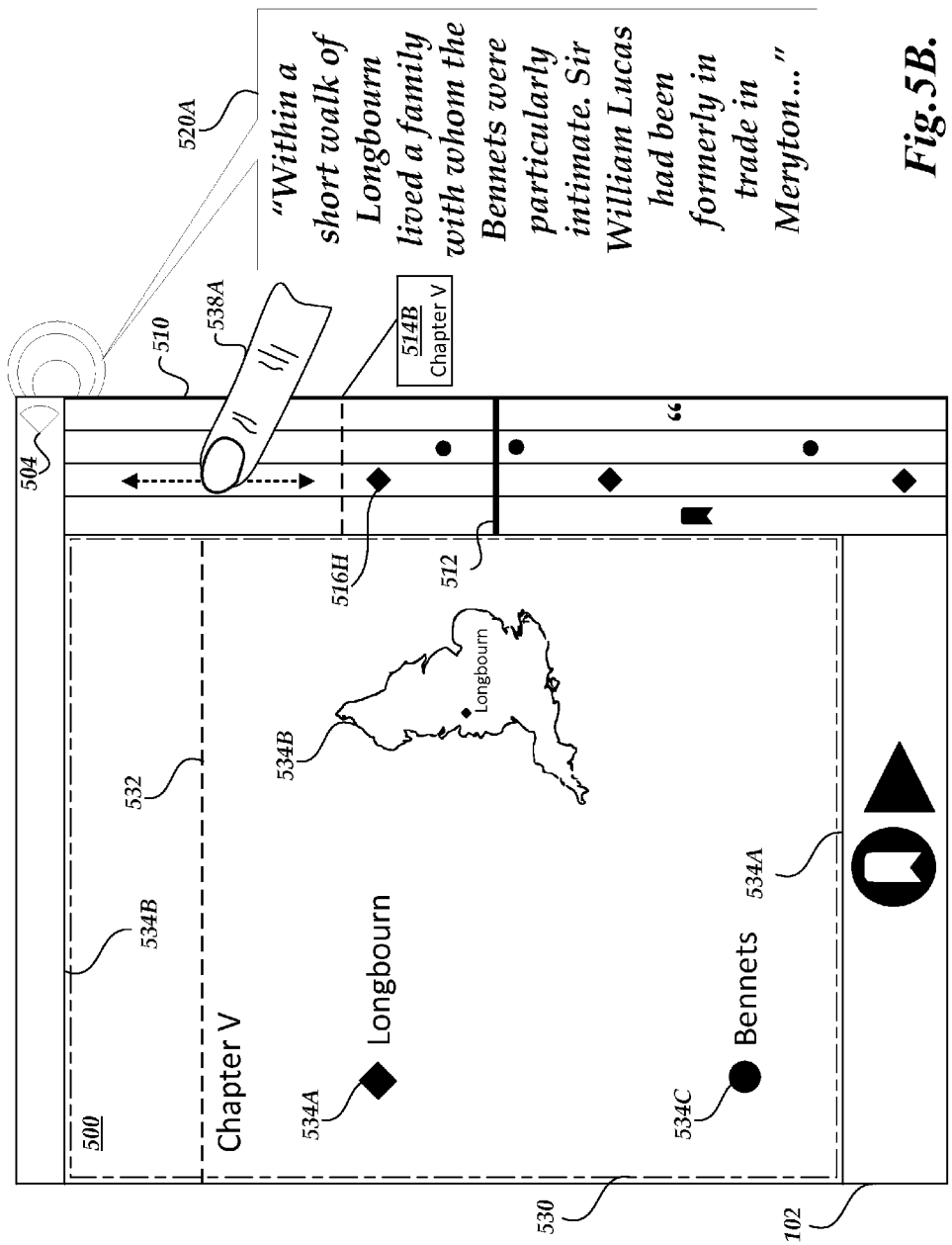
FIG. 5B is a pictorial diagram of an illustrative user interface presented during playback and/or navigation of media content that includes another layout of visual graphics corresponding to supplemental content at another playback position.

As illustrated in FIG. 5B, example user interface 500 may present media content and/or supplemental content at a particular playback position of the media content. For example, the audio 520A presented in the illustrated example includes narrated audio content at a particular playback position, which are the spoken words or phrases: "Within a short walk of Longbourn lived a family with whom the Bennets were particularly intimate. Sir William Lucas had been formerly in trade in Meryton." As illustrated, section marker 514B, which may correspond to "Chapter Five" of the media content, is above and/or before playhead 512 within the timeline navigator 510. Thus, the current playback position of the media content may be after the start of chapter five within the media content. User interface 500 associated with FIG. 5B may illustrate a current playback position near chapter five of the media content, which is in contrast to user interface 500 of FIG. 5A that may illustrate a current playback position near chapter one of the media content. Elements of user interface 500 may update and/or animate as the current playback position changes, which will be described in further detail below.

Example user interface 500 includes presentation area 530. In some embodiments, the content presented within the presentation area 530 may be synchronized and/or correlated with the current playback position of the media content and/or the timeline navigator 510. For example, section marker 532 of presentation area 530 may correspond to "Chapter Five" of the media content, which may illustrate that the start of chapter five of the media content has already occurred during playback. Presentation of supplemental content 534A-C within the presentation area 530 may illustrate supplemental content that has already been referenced during playback of the media content. For example, audio 520A includes the spoken words, "[w]ithin a short walk of Longbourn lived a family with whom the Bennets," which references "Longbourn," a fictional location, and/or "the Bennets," a fictional family. Thus, the illustrated supplemental content 534A and 534B may correspond to the fictional location and/or place, "Longbourn," and/or supplemental content 534C may correspond to the fictional characters, the "Bennets," which were referenced in the media content. Furthermore, the supplemental content within the presentation area 530 may correspond to the timeline markers of timeline navigator 510. For example, supplemental content 534A, which may be illustrated by a diamond graphic and/or icon in this embodiment, may correspond to the timeline marker 516H, which may also be illustrated by a corresponding diamond graphic and/or icon. Thus, user interface 500 may allow a user visualize supplemental content during playback media content.

Elements of user interface 500 may update, animate, and/or stream during the playback of the media content. For example, presentation area 530 and/or timeline navigator 510 may update, animate, and/or stream as the current playback position of the media content changes. In some embodiments, elements of the presentation area 530 including section marker 532 and/or supplemental content 534A-C may visually move in a general vertical manner, which may correspond to the playback of the media content and/or audio 520A. For example, during forward playback of media content, visual markers and/or supplemental content within presentation area 530 may move from the bottom of the presentation area 534A to the top of the presentation area 534B. Visual markers and/or supplemental content may be removed from the presentation area 530 as media playback content continues beyond the content window. Furthermore, audio 520A may be synchronized with the playback and/or animation of elements of the presentation area 530 and/or timeline navigator 510 such that as the spoken words of audio 520A change the corresponding supplemental content updates and/or animates by position or otherwise. In some embodiments, during navigation of the media content, such as rewinding, visual markers and/or supplemental content within presentation area 530 may move from the top of the presentation area 534B to the bottom of presentation area 534A. Similar to the streaming playback and/or animation of visual content within the presentation area 530, elements of the timeline navigator 510 may also update, animate, and/or stream as the current playback position of the media content changes. For example, timeline and/or section markers of timeline navigator 510 may animate and/or be removed from the timeline navigator as the current playback position of the media content changes. In some embodiments, there may be a variation of the streaming and/or animation of supplemental content. For example, supplemental content may stream, animate, and/or move in a general horizontal and/or vertical manner, top to bottom, bottom to top, left and right, right to left, move at an angle, and/or some combination thereof.

In some embodiments, user selection of timeline navigator 510 may presentation area 530 to update. For example, user selection via user input interaction 538A with timeline navigator 510 may cause timeline navigator 510, audio 520A, presentation area 530, and/or user interface 500 to update. The user input interaction 538A may occur via one or more input instruments such as a finger (such as tap, swipe, tap and hold), mouse (such as a click or double-click), or combination of fingers for a multitouch gesture in some embodiments. User input interaction 538A with timeline navigator 510 may allow a user to navigate the media content. In some embodiments, a user may tap, swipe, and/or tap and hold a location on the timeline navigator 510 to navigate to a position within the media content and/or update the current playback position. In some embodiments, user interaction with timeline navigator 510 may cause a synchronized, correlated, and/or near simultaneous update to elements of user interface 500. For example, a user input interaction to rewind the current playback position may cause the timeline navigator to rewind and/or the presentation area 530 to rewind, which may include corresponding visual animations. The timeline navigator 510 and/or the presentation area 530 may animate during user input interaction 538A, such as by moving supplemental content and/or markers in a particular direction and/or adding or removing supplemental content. Furthermore, during the user input interaction, audio 520A may update by playing faster, slower, and/or in reverse, such as for rewinding. In some embodiments, the user may interact with presentation area 530 to update the current playback position, which is described in further detail below.

Figure 5C:
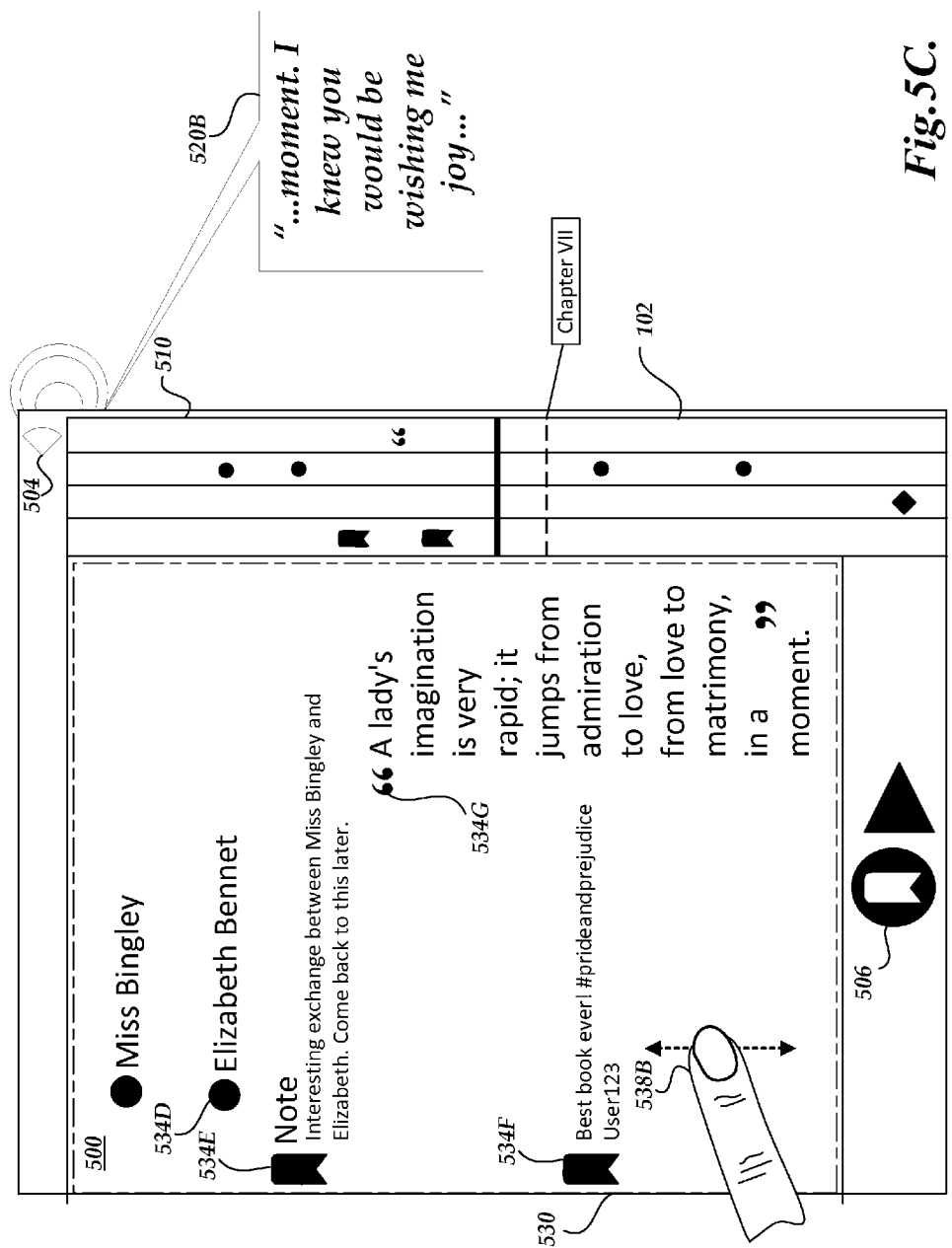
FIG. 5C is a pictorial diagram of an illustrative user interface and/or another example of user navigation of media content.

As illustrated in FIG. 5C, example user interface 500 may update to a different playback position of the media content based on user input. For example, user interface 500 may have been updated in response to user input interaction 538A. For example, the current playback position of the media content may be near chapter seven, which may be illustrated by the elements of the presentation area 530 and/or the timeline navigator 510. In some embodiments, user input interaction 538B within presentation area 530 may cause updates to user interface 500 and/or playback of media content, which may be similar to the updates and/or changes based on user input interaction 538A in FIG. 5B. For example, a touch and/or swipe within presentation area 530 may cause timeline navigator 510, presentation area 530, and/or playback of the media content to change, such as rewinding and/or fast forwarding. In some embodiments, an advantage of receiving user input via timeline navigator 510 and presentation area 530 may be that interactions with each respective control may cause different updates to user interface 500 and/or different playback of the media content, such as each user interface control having different sensitivity levels to user interaction. For example, interactions with timeline navigator 510 may cause the current playback position to "scrub" and/or change faster than interactions with presentation area 530.

In some embodiments, supplemental content may include different content types, which may be indicated to the user and/or displayed graphically. Content types for supplemental content and/or timeline markers may include a character type, a location and/or geographical type, a quote type, a bookmark type, a note type, a user comment type, and/or other types. For example, supplemental content 534D may relate to the fictional character "Elizabeth Bennet," and supplemental content 534D may correspond to a character content type. Another content type may include a bookmark and/or note type, which may correspond to supplemental content 534E. In some embodiments, a note, bookmark, comment, and/or social network message may be added to the media content and/or a current playback position of the media content with the notation control 506. A social network and/or user comment type may correspond to supplemental content 534F. In some embodiments, as described above with reference to illustrative method 400, user comment 534F may be received via a notification and/or message from a supplemental content service. The comment and/or message may have been created by a different user than the user currently consuming the media content. Additionally, the social network message may have been created during the playback of the media content and/or received by the content module 216 via a notification. A quote type may correspond to supplemental content 534G. In some embodiments, supplemental content quotes may be selected by a user and/or may be identified as popular quotes provided by the content server 110. For example, quotes may be selected and/or highlighted in an ebook application and may be shared by the content server 100 as supplemental content 534G. In some embodiments, popular quotes for a particular quote may be received and/or retrieved from a network resource. As illustrated by FIG. 5B, another content type may include a location type that corresponds to supplemental content 534A and/or supplemental content 534B. Furthermore, as illustrated by supplemental content 534B, supplemental content may include images, video, and/or other multimedia content. The inclusion of images and/or other content during playback of the media content may be advantageous. For example, playback of a children's audio-book may include images from the corresponding children's ebook or book, which may enhance the user experience while consuming the media content. In some embodiments, as described above, the content types and/or visual graphics associated with supplemental content within the presentation area 530 may correspond to the timeline markers within the timeline navigator 510. Thus, as illustrated, timeline markers within timeline navigator 510 may be organized and/or presented in a particular layout based on their respective content types (e.g., timeline markers may be presented in a columnar layout).

Figure 5D:
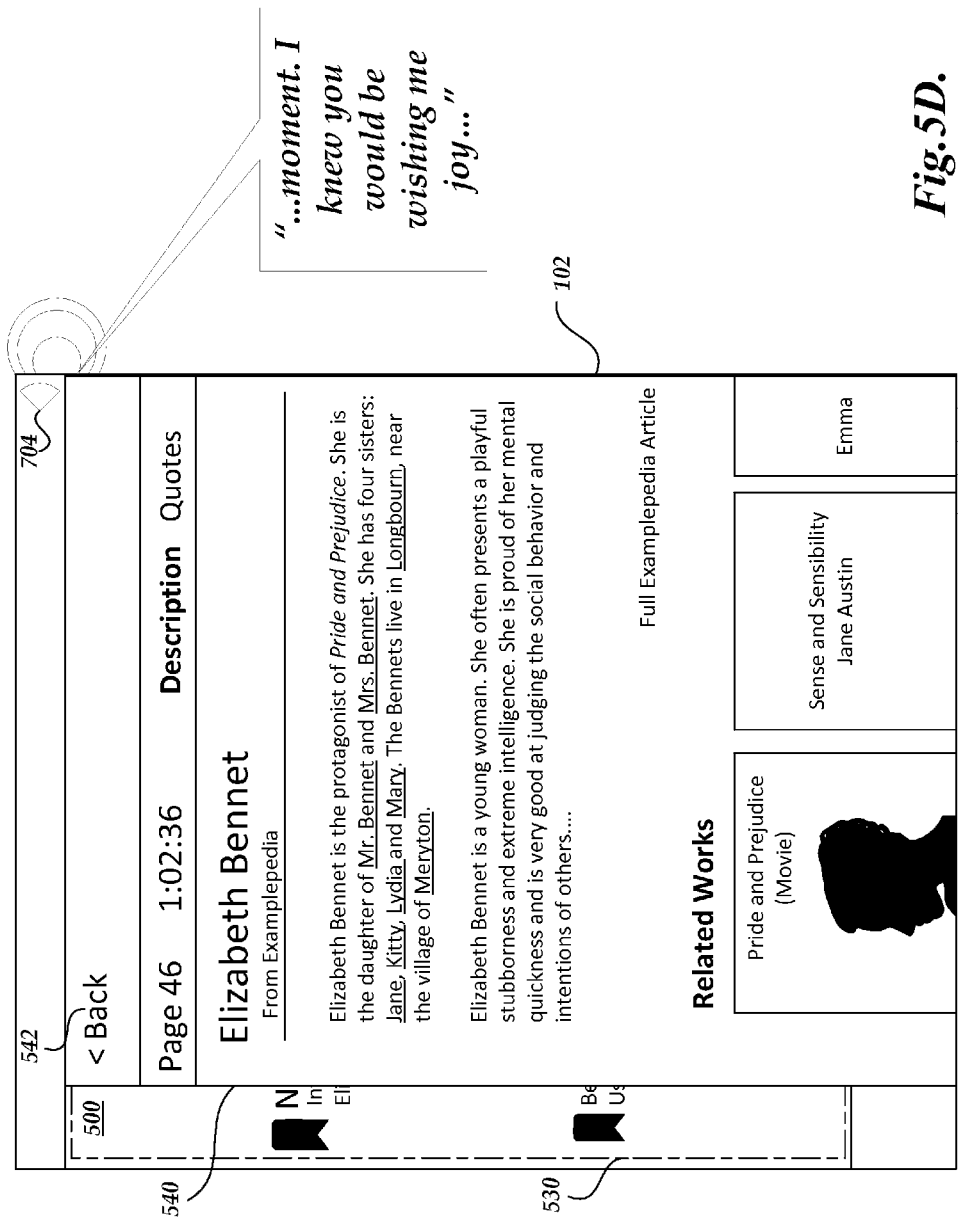
FIG. 5D is a pictorial diagram of an illustrative user interface presented during playback of media content that includes additional supplemental content.

As illustrated in FIG. 5D, user interface 500 may present additional information associated with the supplemental content. For example, supplemental content window 540 may include additional information and/or data regarding supplemental content associated with the media content. In some embodiments, data from the supplement content window 540 may be retrieved from supplemental content data store 112 and/or external data sources associated with media content, such as databases of media, movie, book, fictional, user generated, and/or encyclopedic information. For example, content regarding a particular work may be generated by fans of the work and available for retrieval and/or download by the content module 216 through a network resource. Supplemental content window 540 may also include related content, such as other media content, which may be an opportunity to sell and/or advertise other media content. A user may select supplemental content, such as supplemental content 534D in FIG. 5C, to cause the presentation of the supplemental content window 540 in FIG. 5D, which may overlay elements of user interface 500. Playback of the media content may pause and/or continue during presentation of the supplemental content window 540, depending on the embodiment. User selection of back control 542 and/or presentation area 530 may cause the supplemental content window 540 to disappear and/or be removed, which may result in the presentation of user interface 500 in FIG. 5C, for example.

In some embodiments, user interface 500 may include different layers of content and/or a supplemental content marketplace. For example, FIGS. 5A-C may illustrate a level and/or layer of content and FIG. 5D may illustrate an additional level and/or layer of content. In another example, user interface 500 may include a level and/or layer for user generated content, such as, a level and/or layer that provides user interface controls for a user to add visual illustrations, which may be shared with and/or sold to other users. In some embodiments, user interface 500 may include a supplemental content marketplace that allows users to share, sell, distribute, and/or consume supplemental content. Other examples of levels and/or layers include a premium content layer, an author's notes or commentary layer, and/or layers associated with content types of supplemental content. Similar to the supplemental content which may be shared/or synchronized among a group of users and/or through a social network, layers and or levels may be shared and/or synchronized among users. In some embodiments, a user may specify and/or configure the levels and/or layers associated with media content and/or supplemental content. More information regarding providing additional layers of content and/or a supplemental content marketplace, may be found in U.S. patent application Ser. No. 14/086,895, filed Nov. 21, 2013, entitled "SUPPLEMENTAL CONTENT MARKETPLACE," which is hereby incorporated by reference in its entirety.

Figure 6A:
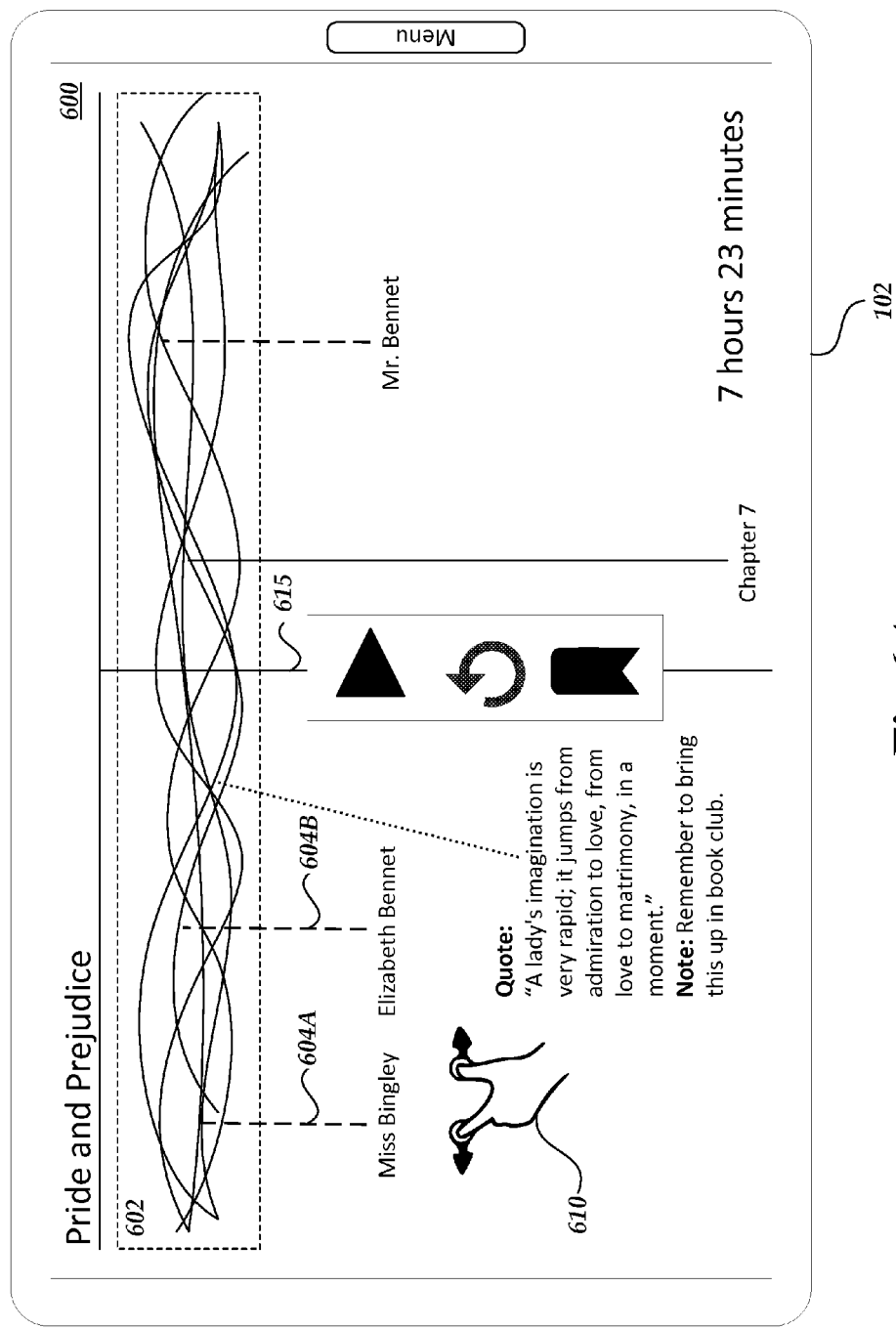
FIG. 6A is a pictorial diagram of an illustrative user interface presented during playback and/or navigation of media content that includes another layout of visual graphics corresponding to supplemental content.
Figure 6B:
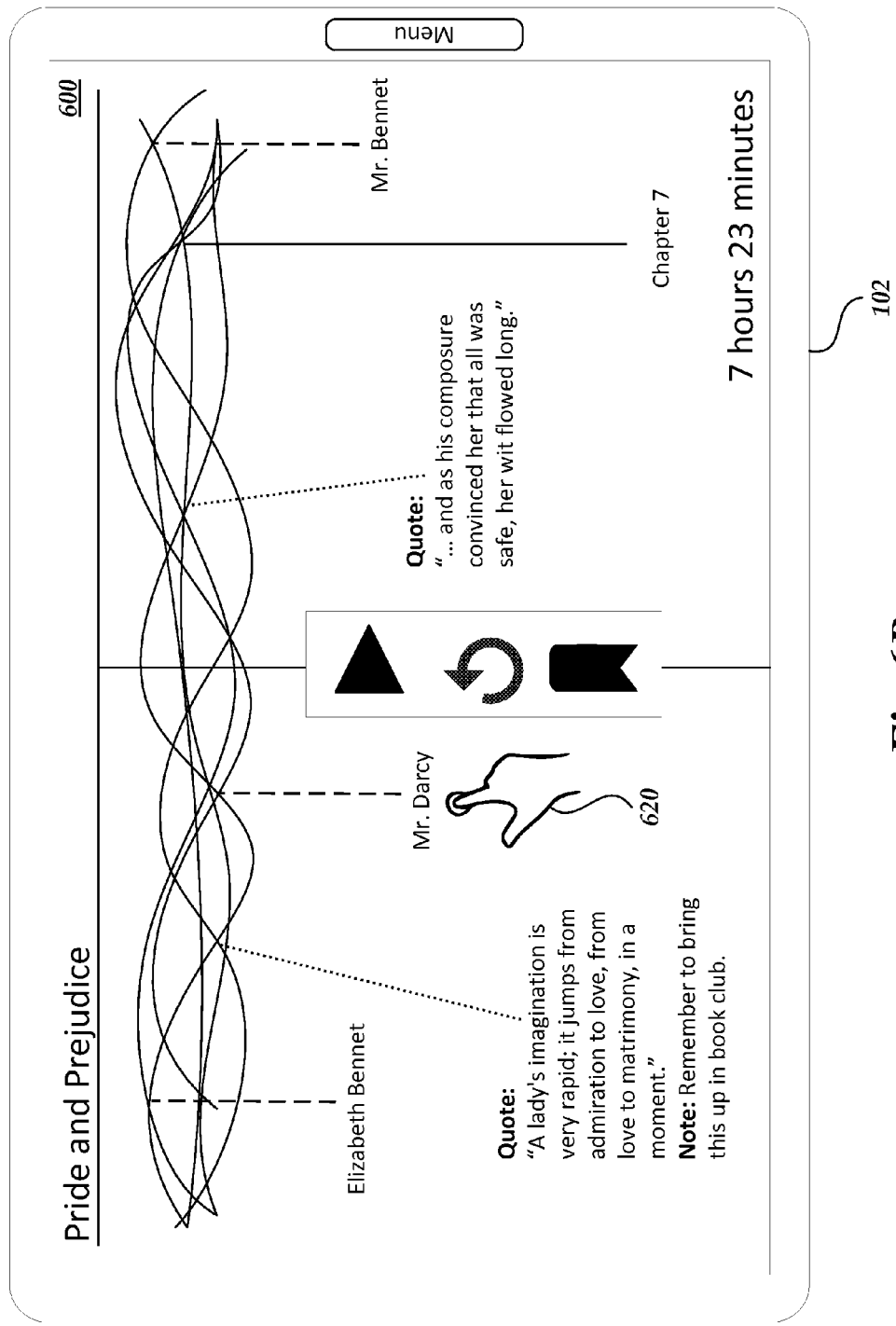
FIG. 6B is a pictorial diagram of an illustrative user interface presented during playback and/or navigation of media content at another level and/or view of media content.

FIGS. 6A-B illustrate an example sequence of representations for user interface 600 presented during playback of media content. As illustrated, user interface 600 includes many elements similar to user interface 500 discussed above (e.g., different types of supplemental content, user interface controls, section markers, etc.). Similar to the generation of user interface 500, elements of user interface 600, such as the supplemental content, may be generated by the content module 216 and/or by the illustrative methods 300 and/or 400. Aspects and/or features of user interface 600 may be similar to user interface 500. For example, playhead 615 of FIG. 6A may be similar to playhead 512 of user interface 500. The animation and/or streaming of supplemental content in user interface 600 may be similar to the animation and/or streaming of user interface 500. However, in the example embodiment, streaming of supplement content may occur left to right and/or right to left, which may differ from the directional streaming of user interface 500. Additionally, playhead 615 may illustrate and/or highlight supplemental content that has already been played and/or supplemental content that will be played in the future. Such supplemental content may provide an overview and/or timeline of content similar to the overview and/or timeline of user interface 500. Example user interface 600 may include user interface controls similar to user interface 500 and/or may respond to user input interactions, such as user input for navigation, similar to the responses of user interface 500 to user input interactions. The user computing device 102 of FIGS. 6A-B may aurally present audio corresponding to words, which may be similar to the aural presentation of audio described in FIGS. 5B-D. In some embodiments, user interface 600 may be configured for certain aspect ratio types, such as a tablet computing device in landscape orientation, which may be in contrast to user interface 500 that may be configured for other aspect ratio types, such as a smartphone in portrait orientation.

As illustrated in FIG. 6A, user interface 600 may include an audio visualizer 602. In some embodiments, audio visualizer 602 may include visual representations of sound waves, frequencies, and/or other representations of audio data associated with the media content. For example, as the audio, sound waves, and/or frequencies of the media content change, the audio visualizer may animate accordingly. In some embodiments, audio visualizer 602 and/or user interface 600 may be visually connected to supplemental content via connectors 604A-B. The waves and/or lines of the audio visualizer may include different colors and/or gradients, such as the lines attached to connectors 604A and 604B that may be represented by different colors and/or gradients.

In some embodiments, user interface 600 may be configured for zoom interaction 610. For example, zoom interaction 610 may include user input to "zoom in" or "zoom out" on the supplemental content and/or the media content. In response to zoom interaction 610, user interface 600 may display additional, different, and/or reveal more supplemental content according to illustrative methods 300 and/or 400. For example, zoom interaction 610 may cause the display of multiple chapters, a single chapter, or some other hierarchical view of the media content. Depending on the level of zoom, the content module 216 may select different items of supplemental content based on priority and/or some other determination, as described above. Additional methods and techniques for displaying hierarchical content, such as zooming in and/or out on content, may be found in U.S. patent application Ser. No. 14/274,380, filed May 19, 2014, entitled "DETERMINING HIERARCHICAL USER INTERFACE CONTROLS DURING CONTENT PLAYBACK," which is hereby incorporated by reference in its entirety.

FIG. 6B may illustrate other aspects of user interface 600. For example, user selection 620 may cause the additional display of supplemental information, similar to the additional display of information illustrated in FIG. 5D. User selection 620 of a supplemental content item may cause the presentation of an overlay window including additional information related to the supplemental content item.

In some embodiments, the display of user interface 600 in FIG. 6B may result from the zoom interaction 610 illustrated in FIG. 6A, described in detail above. For example, zoom interaction 610 may cause the user interface 600 to "zoom in" on the media content near the current playback position. As a result, the supplemental content illustrated in FIG. 6B may differ from the supplemental content illustrated in FIG. 6A.

In some embodiments, it will be appreciated that disclosed herein are systems and methods that enable the determination and/or navigation of media content through various user interactions. For example, a click, tap, swipe, slide, double tap, tap and hold, pinching, scrunching, expanding, zooming, other user interactions or input, and/or some combination thereof may be used to navigate various levels of media content. In some embodiments, pinching and/or expanding may change one or more levels of media content based on the relative degree of the motion and/or interaction. For example, a relative large zoom motion may change more than one level and/or a relative small zoom motion may change only one level.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store configured to at least store an audiobook; and
   one or more hardware computing devices in communication with the electronic data store, and configured to at least:
      receive a current playback position of the audiobook;
      determine a window of time based at least in part on the current playback position;
      determine text data representing a plurality of words spoken in the audiobook based at least in part on the window of time;
      determine a plurality of supplemental content items based at least in part on the text data, wherein the plurality of supplemental content items are retrieved from an index of supplemental content corresponding to respective words or phrases of words from the text data;
      determine, for each supplemental content item of the plurality of supplemental content items, a content type associated with the supplemental content item;
      determine, for each supplemental content item of the plurality of supplemental content items, a position relative to the current playback position; and
      cause presentation of the plurality of supplemental content items in a user interface as the audiobook plays, wherein:
         the plurality of supplemental content items are graphically presented in the user interface corresponding to the determined position of each supplemental content item of the plurality of supplemental content items, and
         each supplemental content item of the plurality of supplemental content items is graphically presented corresponding to the determined content type of each supplemental content item of the plurality of supplemental content items.

2. The system of claim 1, wherein at least one supplemental content item of the plurality of supplemental content items is selectable by a user to cause presentation of additional data in the user interface associated with the at least one supplemental content item of the plurality of supplemental content items.

3. The system of claim 1, wherein at least one supplemental content item of the plurality of supplemental content items comprises at least one of character data, plot data, fictional data, historical data, geographical data, quote data, commentary data, or social network data.

4. The system of claim 1, wherein the one or more hardware computing devices are further configured to at least:
   receive a user initiated request during playback of the audiobook, wherein the user initiated request is generated in response to a user interaction with the user interface including the presented plurality of supplemental content items;
   determine a second playback position of the audiobook based at least in part on the user initiated request;
   determine a second plurality of supplemental content items based at least in part on the second playback position, wherein the second plurality of supplemental content items are retrieved from the index of supplemental content; and cause presentation of the second plurality of supplemental content items in the user interface, wherein at least one supplemental content item of the plurality of supplemental content items is removed from the user interface.

5. The system of claim 1, wherein the one or more hardware computing devices are further configured to at least:
receive a social network supplemental content item during playback of the media content; and
cause presentation of at least the social network supplemental content item in the user interface.

6. A system comprising:
an electronic data store configured to at least store media content; and
one or more hardware computing devices in communication with the electronic data store, and configured to at least:
receive a current playback position of the media content;
determine a plurality of supplemental content items based at least in part on the current playback position, wherein the plurality of supplemental content items are retrieved from an index of supplemental content based at least in part of the current playback position;
determine, for each supplemental content item of the plurality of supplemental content items, a position; and
cause presentation of a subset of the plurality of supplemental content items in a user interface, wherein the subset of the plurality of supplemental content items are graphically presented in the user interface corresponding to the determined position of each supplemental content item of the subset of the plurality of supplemental content items, and wherein the subset of the plurality of supplemental content items are graphically presented in the user interface as the media content plays.

7. The system of claim 6, wherein at least one supplemental content item of the plurality of supplemental content items is selectable to cause presentation of additional data in the user interface associated with the at least one supplemental content item of the plurality of supplemental content items.

8. The system of claim 6, wherein at least one supplemental content item of the plurality of supplemental content items comprises at least one of character data, plot data, fictional data, historical data, geographical data, quote data, commentary data, or social network data.

9. The system of claim 6, wherein the one or more hardware computing devices are configured to at least:
receive a user initiated request during playback of the media content, wherein the user initiated request is generated in response to a user interaction with the user interface including the presented plurality of supplemental content items;
determine a second playback position of the media content based at least in part on the initiated request;
determine a second plurality of supplemental content items based at least in part on the second playback position, wherein the second plurality of supplemental content items are retrieved from the index of supplemental content based at least in part on the second playback position; and
cause presentation of the second plurality of supplemental content items in the user interface, wherein at least one supplemental content item of the plurality of supplemental content items is removed from the user interface.

10. The system of claim 6, wherein the one or more hardware computing devices are further configured to at least:
receive a social network supplemental content item during playback of the media content; and
cause presentation of at least the social network supplemental content item in the user interface.

11. The system of claim 6, wherein the media content comprises an audiobook.

12. The system of claim 6, wherein the one or more hardware computing devices are further configured to at least:
receive a user generated supplemental content item associated with the media content, wherein the user generated supplemental content item is based at least in part on data from a first user; and
cause presentation of at least the user generated supplemental content item in the user interface, wherein the user interface corresponds to a second user.

13. The system of claim 12, wherein the first user and the second user are members of a group, and wherein sharing of supplemental content between the first user and the second user is based at least in part on the first user and the second user being members of the group.

14. A computer-implemented method comprising:
receiving, by a first computing device, a first request initiated during playback of media content on a second computing device, wherein the first request includes data associated with a first position within the media content;
in response to the first request, determining, by the first computing device, a first set of supplemental content items from a plurality of supplemental content items based at least in part on the first position;
determining, by the first computing device, a position in the media content for each supplemental content item of the first set of supplemental content items; and
causing, by the first computing device, presentation of the first set of supplemental content items in a user interface at the second computing device, wherein the first set of supplemental content items is arranged in the user interface according to respective determined positions in the media content.

15. The computer-implemented method of claim 14 further comprising:
receiving, by the first computing device, a second request including data associated with a second position within the media content;
generating, by the first computing device, a mapping from at least one plurality of positions within the media content to at least one supplemental content item of the from the plurality of supplemental content items;
in response to the second request, determining, by the first computing device, a second set of supplemental content items from the plurality of supplemental content items based at least in part on the mapping and the second position;
determining, by the first computing device, a position in the media content for each supplemental content item of the second set of supplemental content items based at least in part on the mapping and the second position; and
causing, by the first computing device, presentation of the second set of supplemental content items in the user interface, wherein the second set of supplemental content items is arranged in the user interface according to respective determined positions in the media content, and wherein the first set of supplemental content items is removed from the user interface.

16. The computer-implemented method of claim 14, wherein at least one supplemental content item of the first set of supplemental content items is selectable to cause presentation of additional data in the user interface associated with the at least one supplemental content item of the first set of supplemental content items.

17. The computer-implemented method of claim 14, wherein at least one supplemental content item of the first set of supplemental content items comprises at least one of character data, plot data, fictional data, historical data, geographical data, quote data, commentary data, or social network data.

18. The computer-implemented method of claim 14 further comprising:
receiving, by the first computing device, a user generated supplemental content item associated with the media content during playback of the media content; and
causing, by the first computing device, presentation of at least the user generated supplemental content item in the user interface.

19. The computer-implemented method of claim 14, wherein the user interface comprises a first presentation area including the first set of supplemental content items, wherein the user interface further comprises a second presentation area of a plurality of markers, and wherein each marker of the plurality of markers corresponds to a respective supplemental content item of the first set of supplemental content items.

20. The computer-implemented method of claim 19, wherein the first presentation area is configured to receive first navigation input, and wherein the second presentation area is configured to receive second navigation input.

21. A computer-readable, non-transitory storage medium storing computer executable instructions that, when executed by one or more computing devices, configure the one or more computing devices to perform operations comprising:
receiving, by a first computing device, a request initiated during playback of media content on a second computing device, wherein the request includes data associated with a time window within the media content;
in response to the request, determining, by the first computing device, a plurality of secondary content items based at least in part on the time window;
determining, by the first computing device, a position in the media content for each secondary content item of the plurality of secondary content items; and
causing, by the first computing device, presentation of a subset of the plurality of secondary content items in a user interface at the second computing device, wherein each secondary content item of the subset of the plurality of secondary content items is arranged according to respective determined positions in the media content.

22. The computer-readable, non-transitory storage medium of claim 21, the request was initiated by a multi-touch user input.

23. The computer-readable, non-transitory storage medium of claim 21, wherein at least one secondary content item of the plurality of secondary content items comprises at least one of character data, plot data, fictional data, historical data, geographical data, quote data, commentary data, or social network data.

24. The computer-readable, non-transitory storage medium of claim 21, wherein the one or more computing devices are configured to perform operations further comprising:
receiving, by the first computing device, a user generated secondary content item associated with the media content during playback of the media content; and
causing, by the first computing device, presentation of at least the user generated secondary content item in the user interface.

* * * * *